United States Patent [19]
Childress

[11] Patent Number: 5,120,098
[45] Date of Patent: Jun. 9, 1992

[54] MANUAL DIGGING IMPLEMENT

[76] Inventor: Olaf Childress, P.O. Box 385, Silver Hill, Ala. 36576

[21] Appl. No.: 577,513

[22] Filed: Sep. 5, 1990

[51] Int. Cl.$^5$ .............................................. A01B 1/02
[52] U.S. Cl. .................................. 294/49; 254/131.5; 294/57
[58] Field of Search ................ 294/15, 49, 50.6, 50.7, 294/51, 54.5, 55.5, 57, 59, 60; 254/131.5

[56] References Cited

U.S. PATENT DOCUMENTS

| | | | |
|---|---|---|---|
| 1,211,175 | 1/1917 | Kinzel | 294/57 |
| 1,908,735 | 5/1933 | Donaldson | 294/49 X |
| 2,247,958 | 7/1941 | Maxcy | 294/59 X |
| 2,716,538 | 8/1955 | Arrowood | 294/49 X |
| 3,078,604 | 2/1963 | Neuman | 294/57 X |
| 3,436,111 | 4/1969 | England | 294/57 X |
| 3,782,770 | 1/1974 | Lee | 294/49 |
| 4,650,232 | 3/1987 | Perry | 294/15 |
| 4,722,512 | 2/1988 | Lighthizer | 294/59 X |

FOREIGN PATENT DOCUMENTS

| | | | |
|---|---|---|---|
| 946914 | 6/1949 | France | 254/131.5 |
| 60074 | 9/1954 | France | 294/59 |
| 64998 | 12/1955 | France | 254/131.5 |
| 76496 | 9/1961 | France | 254/131.5 |
| 169531 | 11/1959 | Sweden | 294/49 |
| 669502 | 4/1952 | United Kingdom | 294/59 |

Primary Examiner—Johnny D. Cherry
Attorney, Agent, or Firm—Richard C. Litman

[57] ABSTRACT

A manual implement comprises of a handle which incorporates a lever shaft in one portion and a torque and lever shaft in another, and a novel integral blade, blade support and handle socket. The implement presents a twice offset but linear line of mechanical forces which allows the user to loosen, excavate and relocate a load of material without the concomitant hard physical exertion normally necessary to accomplish these steps by efficiently translating a minimum amount of force and action by the user into effective mechanical force and action by the implement.

15 Claims, 4 Drawing Sheets

MANUAL DIGGING IMPLEMENT

BACKGROUND OF THE INVENTION

1. Field of the Invention

This invention relates to an improved manual implement, and more particularly to a hand tool comprised of a novel handle and a combination blade, blade support and handle socket with an integral implement fulcrum, which efficiently translates a minimum of physical effort on the part of the user into superior torque and lever forces for effectively loosening, excavating, lifting and relocating a load of material.

2. Discussion of the Prior Art

From farms to factories, from mines to the city, applications for shovels, spades and similar hand tools abound, and one of the most frequent and basic uses of such an implement is in a garden.

Gardening is a greatly favored, widely practiced and highly profitable pastime. In urban areas, however, space is at a premium, and garden plots tend to be small. Since it is not feasible to employ machinery, and noise and pollution factors must be considered, various hand tools have always been used to accomplish the necessary gardening chores. The greatest time and effort consuming task of gardening, and possibly the most dreaded, is tilling. The hard physical exertion required just to cultivate the smallest plot is fatiguing, debilitating and can even be injurious, since such exertion places serious and sometimes unacceptable strain on the heart, the spine, the muscles, and other parts of the body. A yound and healthy person finds it to be a backbreaking job, and an elderly or infirm person may have no chance of performing this task at all.

Many implements and accessories have been developed in an attempt to overcome or at least ease the hard physical labor required to wield a shovel, but these fall far short of their goal. The greatest inherent disadvantage in known tools is their inability to translate the efforts of the user into effective action by the implement so that minimal action and force by the user accomplishes the loosening, excavation and relocating operations of blade load in the most efficient manner possible with the least degree of strain and fatigue.

Tools which have specifically addressed this problem include those disclosed in U.S. Pat. No. 738,057 to O'Connor, U.S. Pat. No. 2,716,538 to Arrowood and U.S. Pat. No. 3,436,111 to England. O'Connor teaches a fulcrum attachment for shovels which allows the shovel handle to act as a lever on the blade to loosen ground, but the device of O'Connor does nothing to alleviate the bending, lifting or physical stress on the user, and only makes loosening the soil easier. Arrowood discloses a soil loosening tool which is also used to remove weeds. Although it employs a lever and fulcrum configuration, it still necessitates bending by the user to upheave the loosened ground, as is shown in the drawings of the patent, and Arrowood makes no provision for excavating and relocating the loose soil. The hand tools of England also incorporate the fulcrum and lever principle for loosening ground, and yet do not provide for excavating and redepositing of the soil except by bending and lifting actions and the concomitant physical strain on the user.

SUMMARY OF THE INVENTION

It is therefore an object of the present invention to provide a manual implement, comprised of an arcuate handle and a combination blade, blade support and handle socket with an integral implement fulcrum, which effectively accomplishes the operations of load loosening, excavating and relocating by efficient translation of a minimum physical effort by the user into the requisite mechanical forces and actions by the implement.

Another object of the present invention is to provide a hand tool which precludes the stooping, bending or lifting normally necessary to perform the various load handling steps, thereby vastly diminishing the physical exertion of the user.

It is also an object of the present invention to provide a manual implement which can be used by anyone, regardless of age or strength, with substantially the same results.

A further object of the present invention is to provide a highly efficient, compact and lightweight hand tool which is inexpensive and easy to manufacture and use.

Other objects within the scope of the invention will become apparent from the following specification, claims and the attached drawings.

DETAILED DESCRIPTION OF THE PREFERRED EMBODIMENT

Figures 1, 2:
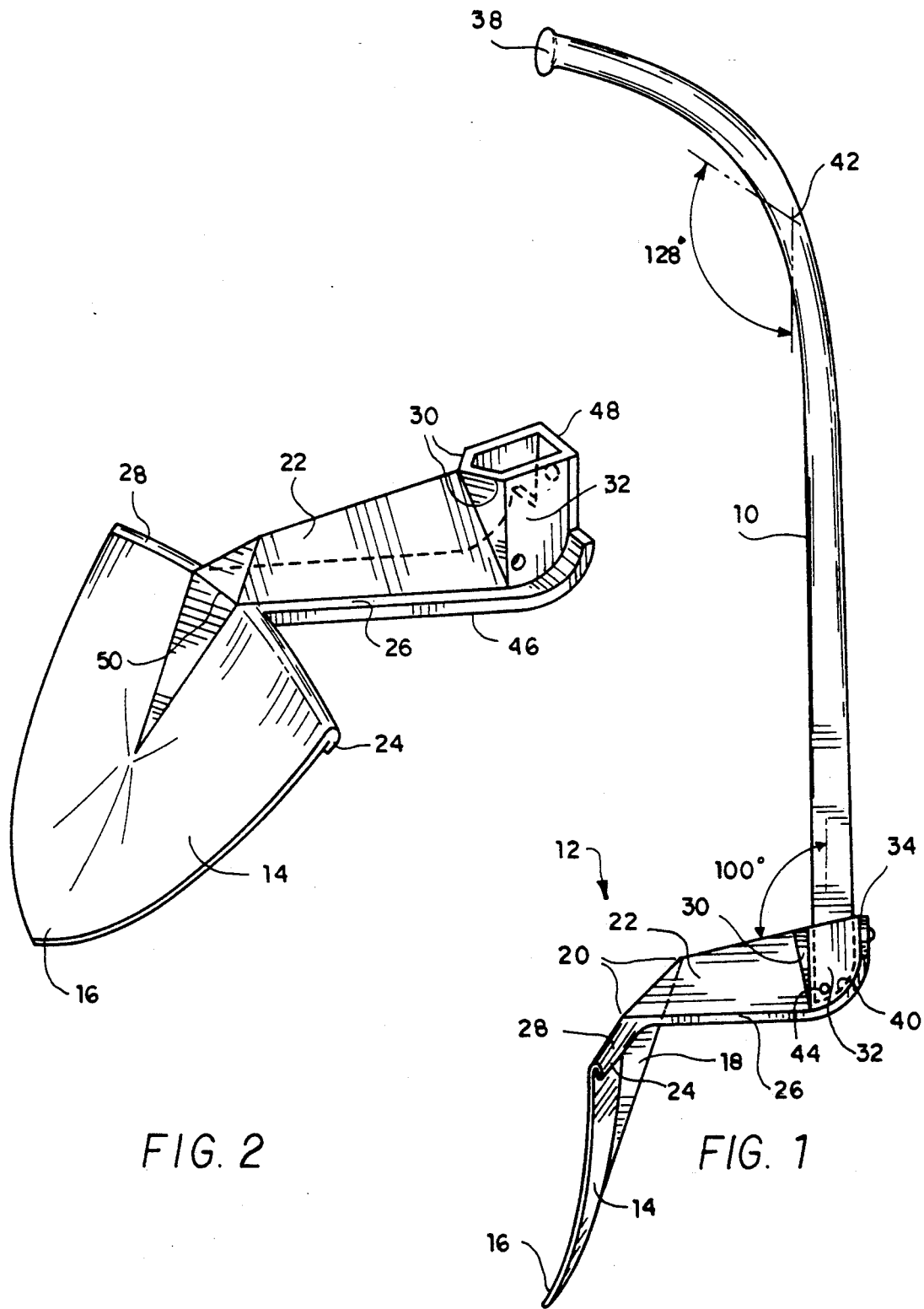
FIG. 1 is a side plan view of the improved manual implement of the present invention.
FIG. 2 is a front elevational view of the combination blade, blade support and handle socket of the present invention.

Referring now to the drawings, the improved manual implement of the present invention is shown at FIG. 1 in utile assembly. The implement includes a handle (10) and an integral blade, blade support and handle socket, generally denoted at (12). Member (12) can be metal or plastic, depending upon the application for which it is intended. A single precut blank of suitable sheet material, such as soft steel or a thermoplastic, can be stamped or folded by any suitable means to form the combined member (12) and may then be otherwise treated or tempered to prepare it for end use.

Member (12) includes a main blade portion (14) with a blade tip (16). The blade shown in the figures is that of a shovel, but particularly configured blades can be formed for special applications or to handle materials of different weight, consistency and blade adherence. Centrally formed in blade (14) is an inverse wedge or V channel (18), the vertex of the V rearward of blade (14) with the edges of the channel sides integral with the blade face. V channel (18) commences upward in blade (14) substantially from blade midpoint. At the uppermost points of the side edges of V channel (18), which are approximately level with the top of the blade face, transition folds (20) commence. Transition folds (20) invert the sides of V channel (18), i.e., fold the sides back upon themselves. This reversal of the sides of V channel (18) at transition folds (20) terminates V channel (18) at blade top, and the angularly folded sides of V channel (18) form an inverted V channel (22) directly above and extending laterally rearwardly of V channel (18) and blade (14). Transition folds (20) terminate at the initial vertex point of inverted V channel (22), which is also the termination vertex point of V channel (18). Examples of angle dimensions may include an approximate 15 degrees off blade face to the vertex of V channel (18) proximate its commencement, and an approximate 26 degrees off V channel (18) vertex for transition folds (20).

The top of blade (14) at its outermost edges is folded rearwardly of blade face to form substantially downturned lips (24). Lips (24) continue along the top of blade (14) toward transition folds (20) in smooth angular transition to blade (14) from substantially downturned at the edges to approximate 90 degree angles off blade (14) at their juncture with commencement of transition folds (20). At the commencement points of folds (20), lips (24) curve at an approximately planar right angles to continue along the bottom edges of inverted V channel (22) as flanges (26), which are attached and substantially perpendicular to inverted V channel (22) along its length. The portions of blade top between lips (24) and transition folds (20) are foot-rests (28), which are intended for step-pushing blade (14) into material in the conventional manner. Inverted V channel (22) extends rearwardly of blade (14) for a distance equal to approximately 70% of total blade length, and terminates at handle socket front faces (30), which are intersecting angularly offset planes between the terminal edges of the sides of inverted V channel (22) and the front edges of socket side faces (32). Socket side faces (32) are positioned substantially parallel to each other by the angular offset of socket front faces (30) from inverted V channel (22), and are of a length slightly greater than the length of the handle base from front to rear. The rear bottom edges of socket side faces (32) are curved in a substantially 90 degree quadrant to form socket fulcrum arcs. When the socket fulcrum arcs are tangential with the rear edges of socket side faces (32), the faces extend rearwardly to form socket tabs (34). Tabs (34) are of a width equal to the distance between the rear points of tangent of the socket fulcrum arcs and the tops of socket side faces (32), and are of a length slightly greater than the handle base width. Tabs (34) are folded one over the other, the outermost tab forming the rear face of the handle socket.

At their initial contact point with socket side faces (32), flanges (26) curve through an arcuate quadrant portion to form flange fulcrum arcs complementary to the socket fulcrum arcs, and widen interiorly of socket side faces (32). At the socket fulcrum arc tangent points, the width portions of flanges (26) exterior of socket side faces (32) end in substantially planar edges, and the widened portions of flanges (26) interiorly of the socket side faces (32) extend to form flange tabs (36), which are of a width equal to the distance between socket side faces (32) and of a length equal to extend to the top of the socket rear face formed by overlapped socket tabs (34). Flange tabs (36) smoothly overlap interiorly of overlapped socket tabs (34), and the handle base is fastened in the rear of the socket through all four tabs (34, 36).

Handle (10) includes grip (38) at its top end, which is substantially oval in cross section, and the handle smoothly transits from substantially oval in diminished section at grip (34) along its length to substantially rectangular in increased section at handle base (40), the longer sides of the rectangle being the side faces of the handle base. The transition of handle (10) over its length is shown more fully at FIG. 3. Handle (10) may be of other shapes, or combinations of shapes. Two requirements in configuration of the handle cross section are that the handle be of sufficient dimensions to efficiently withstand the physical stresses at the socket when the handle is moved and the blade meets the resistance of the load to be lifted, which is translated through the blade and blade support to the socket and thus to the handle base, and the grip be easily grasped and held by the hand of the user. The upper portion of the handle is in diminished cross section because this corresponds with diminished stresses at that portion of the handle, while the base is of sufficiently larger section to effectively wield member (12).

An arc (42) is formed in handle (10) approximately one quarter of the total handle length from grip (38). Appropriate handle measurements are, by way of example, approximately 32" in length from base (40) to arc (42), and about 1' in length from the handle arc to grip (38), with an arc of approximately 128 degrees. While the overall length of the handle and degree of arc can vary, the detail proportions of the handle remain the same. The section of handle between grip (38) and handle arc (42) forms a torque shaft and lever portion, and the degree of arc extends that handle portion forward a distance substantially equal to the combined lengths of the blade support and socket. To accomplish this, the vertical axis of handle (10) off inverted V channel (22) would be 100 degrees in the case of the example proportions given above for handle length and handle arc degree.

Figure 3:
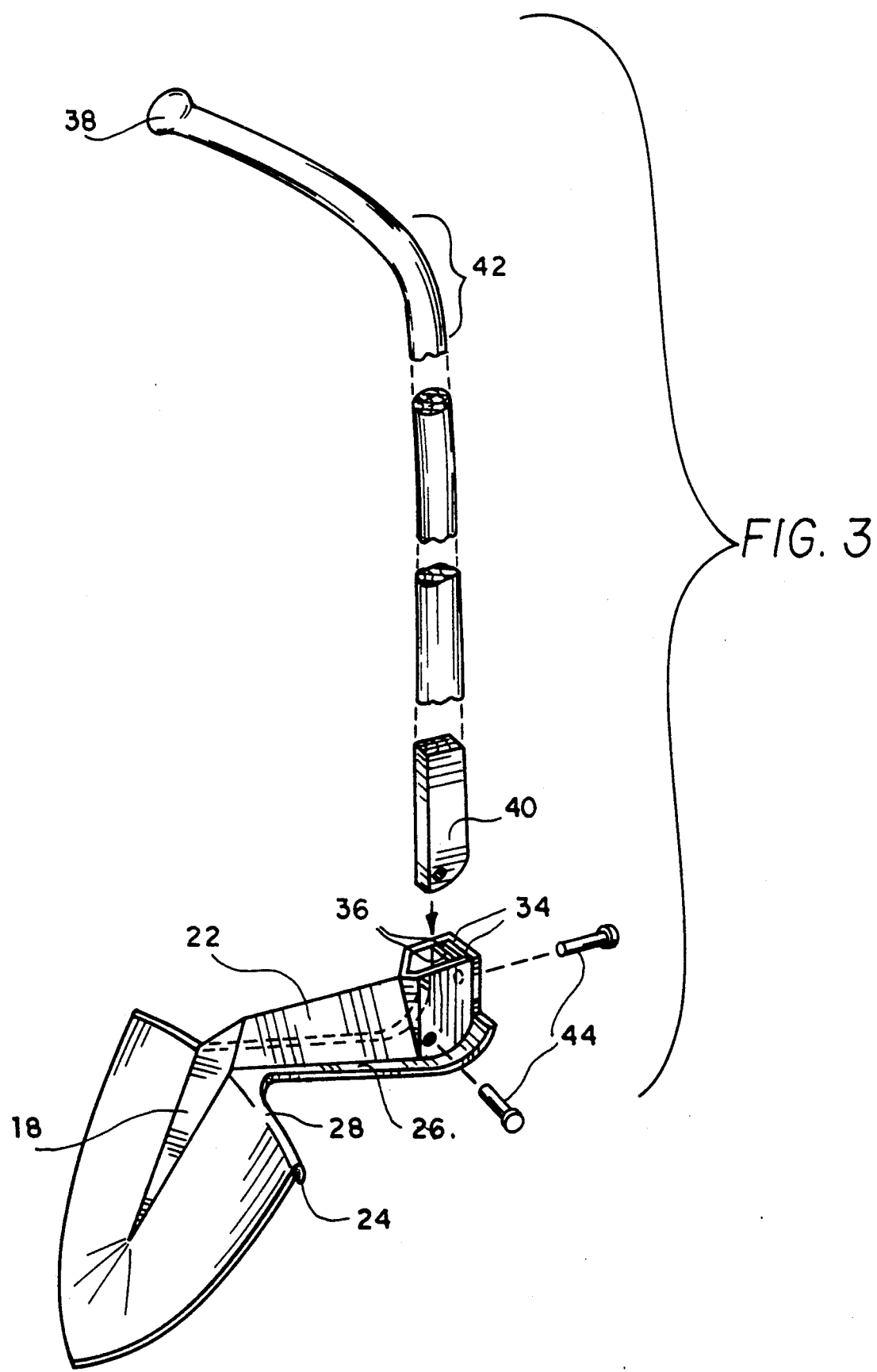
FIG. 3 is an exploded elevational view of the handle with the combination blade, blade support and handle socket of the present invention.
Figures 4, 5:
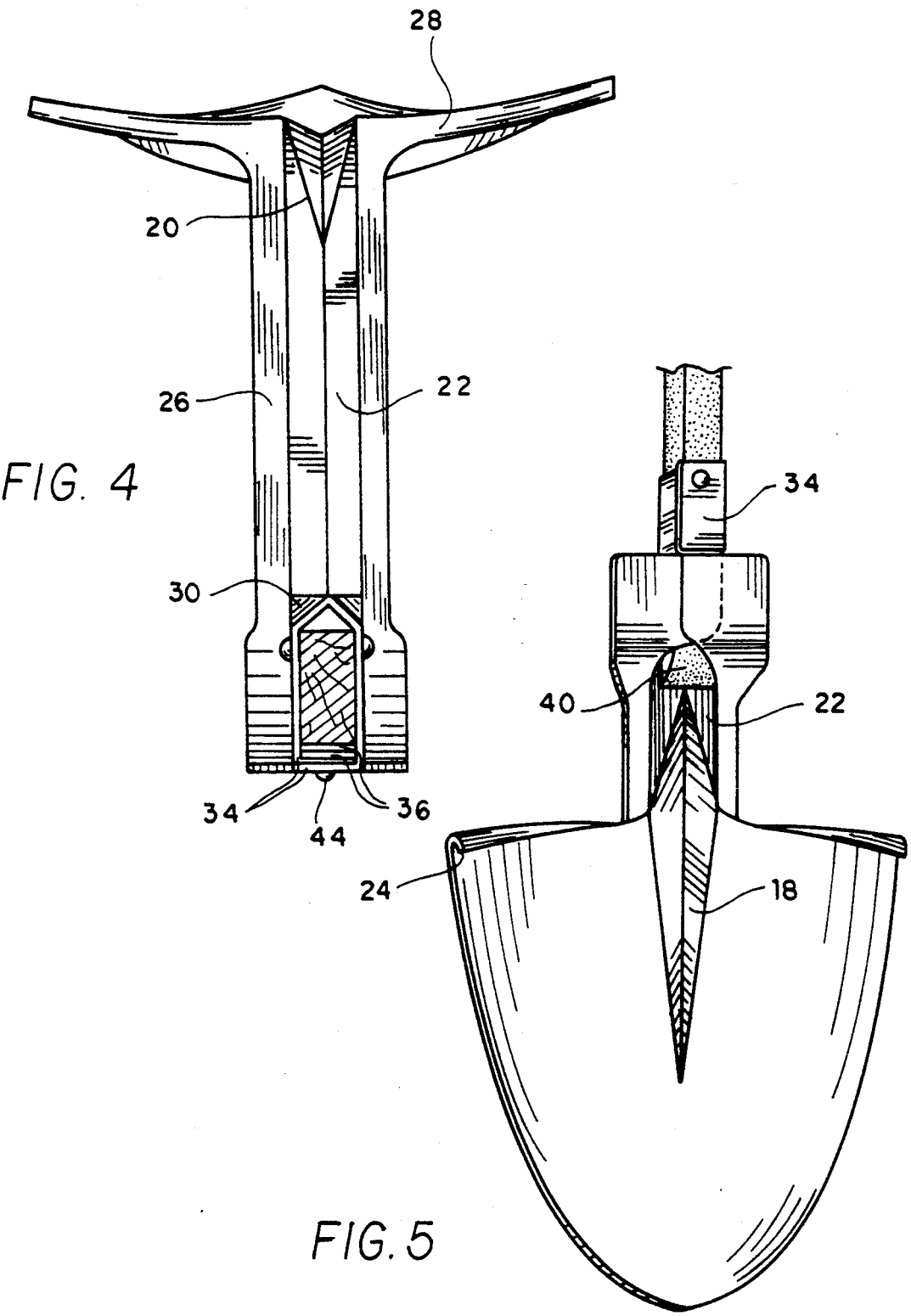
FIG. 4 is a top perspective view of the combination blade, blade support and handle socket of the present invention, with the handle base in cross section.
FIG. 5 is a rear elevational view of the combination blade, blade support and handle socket of the present invention.

From the bottom to the rear face of handle base (40) is a one quarter curve which forms the handle fulcrum arc, also seen in FIGS. 3 and 5, and which allows base (40) to precisely seat in the socket. Handle (10) is secured in the socket by fastening means (44) through each socket side face (32) substantially at the lowermost front corners of base (40), and through the tabs (34, 36) substantially at its uppermost central portion within the socket. The position of the socket side face fastenings prevents the tendency of base (40) to drive forward and rupture socket front faces (30) and inverted V channel (22), in addition to otherwise securing the handle within the socket. The rear fastening stabilizes the socket and secures it to itself by securing overlapped socket tabs (34) and flange tabs (36) overlapped therebeneath. This fastening also precludes the tendency of base (40) to drive downward or otherwise deform the socket, as well as further fastening the handle within the socket. Upon fastening base (40) in the socket, the implement is complete, and a smoothly integral implement fulcrum is provided.

In FIG. 2, the combination blade, blade support and handle socket is shown in elevation. A cover plate (46) is attached along the side edges of inverted V channel (22) and socket side faces (32) to thus close the bottom of the channel and socket from materials having high adherence, preventing them from compacting within the channel and the open bottom of the socket. Plate (46) extends perpendicularly beyond the side edges of inverted V channel (22) to form the flanges (26), with the flange ends proximate blade (14) attached to footrests (28). Plate (46) is attached to socket side faces (32) and includes a 90 degree curve to form the implement fulcrum arc, the flange portions exterior the socket ending as substantially planar surfaces. The distal portion of plate (46) extends to form socket rear face (48), which is attached to socket side faces (32) along their rear edges. Blade plate (50) is attached to V channel (18) at the channel edges on the blade and along transition fold lines (20) to close the blade face.

The view at FIG. 3 illustrates the implement of the present invention with an exploded view of the handle to show its cross section along various points of its length. Tabs (34, 36) are illustrated in overlapped relationship, and the handle base fulcrum arc is shown. The positions of insertion for fastening means (44) are also illustrated. Fastening means (44) may be any pin type fastener, such as screw-threaded devices, dowel pins, rivets, etc., with suitable characteristics for attachment of the handle without shearing or damage to the handle base or socket under normal use.

FIG. 4 illustrates a top perspective view of member (12) showing handle base (40) in cross section at the point where it enters the socket. Socket front faces (30) are angularly offset from the front face of handle base (40). Tabs (34, 36) are shown overlapped and fastened. The size of the socket and length/width of tabs (34, 36) are dependent upon blade size, since flanges (26) and inverted V channel (22) form the blade support and their size and length are also determined by blade size. Handle base (40) would be complementary in size to wield member (12); thus, a larger blade would entail a larger support and larger socket, and a larger handle base. The top view shows blade (14) substantially bowled and a point to tip (16). Blade (14) and tip (16) would alter from that shown if the blade were formed in a particular configuration for a specific application and, in that instance, V channel (18) might be partially visible in blade (14).

FIG. 5 shows a rear view of member (12) of the present invention in slight perspective elevation, illustrating the widening of flanges (26) interiorly of socket side faces (30), the fulcrum arc curve of handle base (40), and the transit of lips (24) from downturned at blade edge to right angle off blade (14) at transition folds (20). Footrests (28) are at a slight slope but nearly perpendicular to blade tip (16), so the slope is not great enough to allow the foot of the user to readily slide off. Lips (24) are downturned at the outermost edges of blade (14) and continue along the top of the blade face while simultaneously and smoothly turning upward, so they are at a substantially 90 degree angle to blade (14) as they reach blade top terminii, approximately parallel to the ends of the edges of inverted V channel (22) and commencement points of transition fold lines (20). Formation of downturned lips (24), smooth transition of footrests (28) to right angle off blade (14) at blade top terminii, and planar right curves into flanges (26) provide the necessary rigidity for inverted V channel (22), and a highly effective stabilization of compression forces between the implement fulcrum and blade under load.

Figure 6:
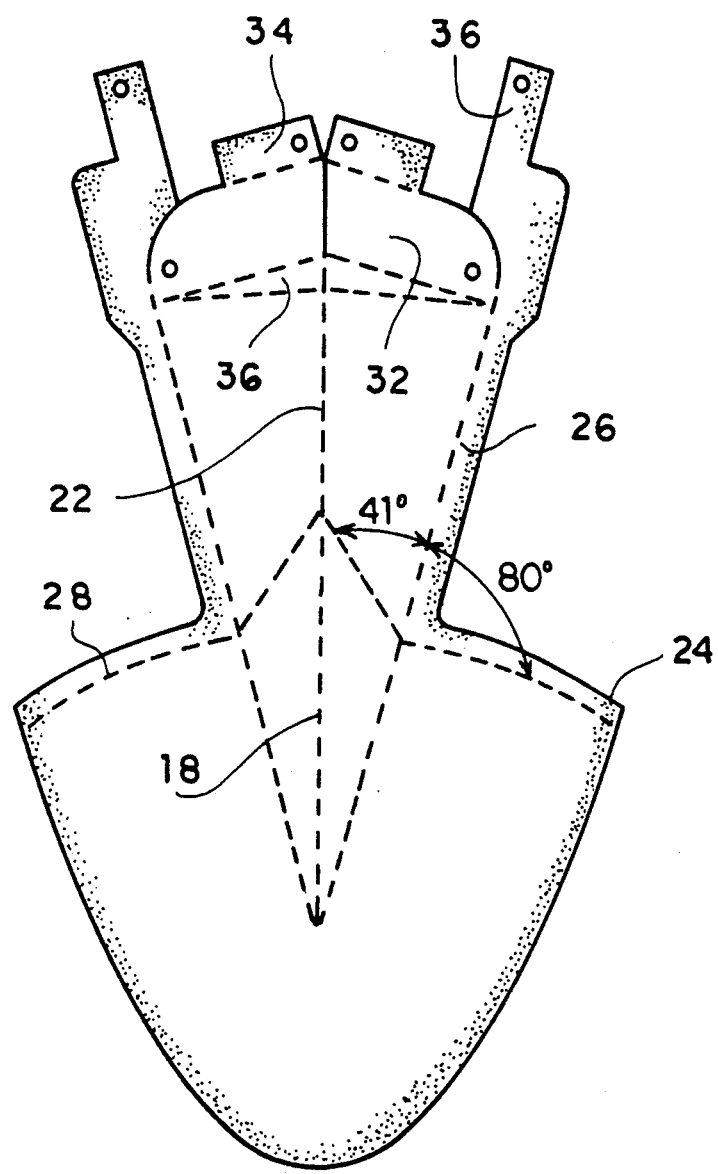
FIG. 6 is a schematic illustration of a precut single blank of sheet material which forms the combination blade, blade support and handle socket means.

FIG. 6 is an example of the precut single sheet material from which the integrally folded member is made. For the example of dimensions given above for the blade and handle, the angle of footrests (28) off inverted V channel (22) would be 80 degrees, thereby giving additional height to the outside top corners of blade (14) for downturned lips (24) to enhance the substantially perpendicular footrest angle off blade support. The angle of transition lines (20) between V channel (18) and inverted V channel (22) would be 41 degrees, causing the implement fulcrum to be lifted higher off grade in the fully formed member (12) when the blade is located and moved to depth, as well as allowing the handle to be thrust forward, away from the user, when secured into the socket formed in member (12).

In use, the blade tip is positioned rearwardly adjacent the material to be excavated. The user initially grips the handle arc with either hand and steps on either footrest. The relationship of the straight sides of the blade and the blade tip provide enhanced facility for entry of the blade into the material, in this case compacted soil. The blade cuts slightly forward of a straight downward direction, and the implement fulcrum arc is raised approximately 15 degrees above the plane of the footrest as the blade sinks into the ground to the desired depth, thus raising the implement fulcrum from grade approximately two to three inches when the blade is at depth. With the first hand grasping the handle arc, the user draws the handle backward and downward, thereby breaking loose the soil as backward/downward movement of the handle brings the initial point of the implement fulcrum down to engage grade. The downward thrust on the handle causes the implement fulcrum to indent at grade level and thus become a radially moving point of fulcrum, or a fixed heel, and tensions the implement fulcrum in grade to prevent fulcrum slippage. The designed angle of blade penetration into material is to be rearward of vertical by only such degree as affords sufficient adherence of material to blade.

With the second hand, the user then grips the torque shaft and lever portion of the handle between the grasped handle arc and the grip and continues backward/downward motion of the handle, which excavates the blade and its load without the user bending or lifting, and moves the point of fulcrum rearwardly along the arc curve. Releasing the handle arc, the user places the first hand on the grip and continues backward/downward handle movement. This latter step engages the rear point of arc of the implement fulcrum and raises the blade with its contents to a height equal to the length of the inverted V channel and handle socket with fulcrum radius above the excavation site, the blade substantially level with grade. At this point, for ease of the user, the handle end may be gripped with both hands or one hand may grip the other. The user then turns wrist and hand to either side to cause linear sideward movement of the blade, or can walk-pivot the blade between the points of the handle grip and fulcrum to a complete 180 degree turn if desired. However, a turn of the wrist and the stationary points of the implement fulcrum and the handle grip move that portion of the blade and blade support beyond the implement fulcrum in an exaggerated arc, and a flick or twist in either direction of wrist and hand strikes either side of the blade on grade at a desirable optimum distance from the site of excavation without necessitating lifting or throwing of blade load. This optimum set-aside distance of blade load, like the height of the blade off grade when fully excavated, is determined by the length of the inverted V channel and the socket with the radius of the implement fulcrum arc. The substantially straight edges of the formed blade combined with their angle off blade center insures that the sides of the blade strike grade along their entire length at the same instant, providing a maximum overturning and vacating of the load from the blade.

The torque and leverage provided by the implement of the present invention is mainly an efficient relationship between the length of the blade, the length of the inverted V channel support, the shape and radial length of the fulcrum, and the angle of the handle and the length of the handle to its arc. Many variations and modifications as to materials of construction and the dimensions stated above in describing the invention are possible, for which reason the embodiment herein is detailed mainly by relative proportions. The implement describes a compact line of mechanical forces, twice offset but nonetheless linear, which provides a straight lever action with one part of a handle which becomes a lever and torque shaft with another, and a highly efficient blade, blade support and handle socket member which integrates an implement fulcrum and provides effective translation of physical action into optimum mechanical reaction. The line of mechanical forces presented by the implement configuration also overcomes the stresses of linear compression and tension without the need for any additional attachments, braces, or other implements. The particular construction of the handle and of the combined blade, blade support, handle socket and integral fulcrum provide lateral strength and stability along all of its individual components, thereby imparting inherent superior strength to a lightweight and compact implement.

It can be seen from the description of the implement of the present application that the combination blade, blade support and socket member may be produced in a wide variation of sizes, shapes and attitudes for application to tasks involving many types of materials which may have differing weight, consistency and blade adherence. Although solving the problem of the physical exertion necessitated by the task of tilling is a major consideration to the spirit of the invention, the invention is by no means limited to that function. Any application requiring manual handling of load material such as by a conventional spade, shovel or similar implement is well within the scope of the present invention.

What is claimed is:

1. A manual digging implement for moving material comprising:
   a handle means with grip means at one end, a handle base at the other end, and a central handle portion curved about one fourth the way from said grip means end to said handle base end so as to position said grip means forwardly of said handle base when the implement is in a normal upright position;
   integral blade means, blade support means, and handle socket means wherein the lower exterior portion of said socket means is formed to provide an overall implement fulcrum means;
   said handle base mating precisely within said socket means along complementary arcuate quadrant portions of both;
   attachment means for securing said handle base to said socket means; whereby
   minimum physical exertion by the operator is required to effectively loosen, excavate, and move said material.

2. The implement as set forth in claim 1, wherein said blade means includes a tip and a face for contacting material and a central widening vertical V channel, the sides of said V channel folded reversely upon themselves at the top of said blade face, said blade support means includes an integral extension of said reversely folded sides directly above said V channel as a rearwardly directed member terminating in a rear portion, and said socket means includes faces integrally formed with said rear portion of said rearwardly directed member.

3. The implement as set forth in claim 2, wherein said blade top includes rearwardly downturned lips at the outermost edges thereof, said downturned lips commencing along said blade top to proximate said reversely folded sides of said V channel and substantially perpendicular to a blade angle proximate said reversely folded sides in smooth angular transit from said downturned lips.

4. The implement as set forth in claim 3, wherein said rearwardly directed member includes substantially perpendicular flanges attached to side edges of said member along the length of said member, the ends of said flanges distal from said blade means including quadrant fulcrum arcs formed therein.

5. The implement as set forth in claim 4, wherein a rear face of said socket means is formed by overlapped tabs integral with side faces of said socket means.

6. The implement as set forth in claim 5, wherein said ends of said flanges include tabs positioned interiorly of said rear face of said socket means.

7. The implement as set forth in claim 6, wherein said handle base is fastened in said socket means through the lowermost front portion of said side faces of said socket means.

8. The implement as set forth in claim 7, wherein said handle base is fastened in said socket means through the uppermost central portion of said tabs of said flanges and said rear face tabs.

9. The implement as set forth in claim 3, wherein said rearwardly directed member includes a plate attached to the edges of the sides of said member along the underside length of said member, said plate including planar extensions beyond said side edges which form flanges substantially perpendicular to said member, the ends of said flanges distal from said blade means including one-quarter fulcrum arcs formed therein.

10. The implement as set forth in claim 9, wherein said rear face of said socket means is a rearward extension of said plate.

11. The implement as set forth in claim 10, wherein said handle base is fastened in said socket means through the lowermost front portion of said side faces of said socket means.

12. The implement as set forth in claim 11, wherein said handle base is fastened in said socket means through the uppermost central portion of said rearward extension of said plate.

13. The implement as set forth in claim 2, wherein said V channel includes a cover plate attached to the edges thereof.

14. The implement as set forth in claim 2, wherein said rearwardly directed member is a rearwardly directed inverted V channel.

15. The implement as set forth in claim 1, wherein said blade means, blade support means and socket means are formed from a precut single blank of sheet material.

* * * * *